United States Patent
Lee

(12) 
(10) Patent No.: US 6,672,188 B2
(45) Date of Patent: Jan. 6, 2004

(54) FRAME STRUCTURE FOR POWER SAW MACHINE

(76) Inventor: Wy Peron Lee, 11750 Sterling Ave., Suite C, Riverside, CA (US) 92503

( * ) Notice: Subject to any disclaimer, the term of this patent is extended or adjusted under 35 U.S.C. 154(b) by 152 days.

(21) Appl. No.: 09/774,402

(22) Filed: Jan. 30, 2001

(65) Prior Publication Data

US 2002/0100353 A1 Aug. 1, 2002

(51) Int. Cl.[7] .............................. B26D 7/08; B28D 1/04; B28D 7/02
(52) U.S. Cl. ............................ 83/168; 83/169; 83/171; 83/477.2; 83/435.11; 451/450; 451/361; 125/13.01
(58) Field of Search .................... 125/35, 13.03, 125/13.01, 16.03, 16.04, 16.01; 451/450, 488, 360, 361, 363, 307, 449, 342, 343, 453, 356; 83/168, 169, 171, 473, 474, 581, 475, 477.1, 477.2, 435.11, 699.51

(56) References Cited

U.S. PATENT DOCUMENTS

| | | | |
|---|---|---|---|
| 2,441,535 A | * 5/1948 | Sanders | 125/13.01 |
| 2,514,826 A | * 7/1950 | Zuzelo | 125/13.03 |
| 3,103,922 A | * 9/1963 | Nelson | 125/13.01 |
| 4,428,159 A | * 1/1984 | Sigetich et al. | 128/13.03 |
| 4,446,845 A | * 5/1984 | Harding | 125/13.03 |
| 4,991,354 A | * 2/1991 | Schweickhardt | 125/35 |
| 5,172,680 A | * 12/1992 | Swan | 125/12 |
| 5,676,124 A | * 10/1997 | Lee | 125/13.01 |
| 5,746,193 A | * 5/1998 | Swan | 125/13.03 |
| 6,080,041 A | * 6/2000 | Greenland | 125/13.01 |
| 6,119,676 A | * 9/2000 | Greenland | 125/35 |
| 6,272,961 B1 | * 8/2001 | Lee | 83/581 |
| 6,276,990 B1 | * 8/2001 | Greenland | 451/11 |
| 6,283,110 B1 | * 9/2001 | Lee | 125/13.01 |
| 6,347,624 B1 | * 2/2002 | Smith et al. | 125/13.01 |
| 6,439,218 B1 | * 8/2002 | Hulett | 125/11.22 |

* cited by examiner

Primary Examiner—Boyer D. Ashley
(74) Attorney, Agent, or Firm—Raymond Y. Chan; David and Raymond Patent Group

(57) ABSTRACT

A frame structure for a power saw machine that includes a main frame, supporting frame, and collecting tray. The main frame includes first and second main arms in a parallel manner, a main post vertically supported by the first main arm, and a supporting shaft horizontally extending from a top portion of the main post for rigidly supporting a power saw assembly. The supporting frame includes a supportive column downwardly extending from the main post, a pair of support pillars extending from a bottom end of the supportive column to the first main arm at a predetermined angle, and a support arm extending from the bottom end of the supportive column to the second main arm. The collecting tray includes a receiving cavity for supporting the supporting frame so as to substantially support the main frame.

25 Claims, 4 Drawing Sheets

FRAME STRUCTURE FOR POWER SAW MACHINE

BACKGROUND OF THE PRESENT INVENTION

1. Field of Invention

The present invention relates to a power saw machine, and more particularly to a frame structure for power saw machine, which can rigidly support the power saw machine. Thus, the frame structure is simple and in relative lightweight so as to reduce the overall weight of the power saw machine.

2. Description of Related Arts

A conventional cutting saw machine is commonly used for shaping and cutting masonry tiles and the like, made from materials such as granite, marble, slate, ceramics, pave, and brick. The conventional cutting machine comprises a cutting table supported on a supporting frame, a power saw assembly suspendedly supported on the cutting table wherein the power saw assembly comprises a cutting head having circular saw blade which is powered by an electric motor and a transmission means for driving the saw blade to rotate, and a tray mounted underneath the supporting frame for collecting and replacing a liquid coolant therein.

Such conventional cutting machine is too heavy and bulky for home usage so that people always have difficulties to transport and store the cutting machine. Because of the cutting quality of the power saw assembly, the power saw assembly must be made of durable and rigid materials, which will increase the overall weight of the cutting machine. Thus, for supporting the heavy power saw assembly, the supporting frame must be made of strong material such as cast iron or steel alloy. So, the cutting machine becomes extremely heavy and it is impossible for a user to carry or transport.

However, people still prefer to use the heavy cutting machine because they think the heavy cutting machine can provide more power and better cutting quality. It is worth to mention that the power of the cutting machine is only depended on the rpm of the motor and for better cutting work, the power saw assembly must rigidly supported on the supporting frame in a stable manner. So, the cutting machine cannot be counted its weight. In fact, the lightweight cutting machine is better because of ease carriage.

It is unreasonable to reduce the weight of the power saw assembly in order to affect the cutting performance of the cutting machine. So, the only way to reduce the overall weight of the cutting machine is to minimize the weight of the supporting frame. However, the weak structure of the supporting frame will make the cutting head unstabilized such that vibrations generated from the power saw assembly will be transferred to the cutting table so as to directly affect the cutting quality of the cutting machine.

SUMMARY OF THE PRESENT INVENTION

A main object of the present invention is to provide a frame structure for power saw machine which can rigidly support the power saw machine.

Another object of the present invention is to provide a frame structure for power saw machine which is simple and in relative lightweight so as to reduce the overall weight of the power saw machine. So, the power saw machine can be easily carried and transported to everywhere.

Another object of the present invention is to provide a frame structure for power saw machine, wherein vibrations generated for the power saw assembly can distributed through the entire power saw machine so that the power saw machine can be operated in a stable manner.

Another object of the present invention is to provide a frame structure for power saw machine which does not require to alter the original structure of the power saw machine so as to minimize the manufacturing cost of the power same machine.

Another object of the present invention is to provide a frame structure for power saw machine that can be easily assembly or disassembly to use or store.

Accordingly, in order to accomplish the above objects, the present invention provide a frame structure for power saw machine, comprising:

a main frame comprising a first and second main arms in parallel manner, a main post vertically supported by the first main arms, and a supporting shaft horizontally extended from a top portion of the main post for rigidly supporting a power saw assembly thereon;

a supporting frame comprising a supportive column downwardly extended from the main post, a pair of support pillars each extended from a bottom end of the supportive column to the first main arm at a predetermined angle, and a support arm extended from the bottom end of the supportive column to the second main arm; and a collecting tray having a receiving cavity wherein the supporting frame is fittedly disposed therein so as to substantially support the main frame on the collecting tray.

DETAILED DESCRIPTION OF THE PREFERRED EMBODIMENT

Figure 1:
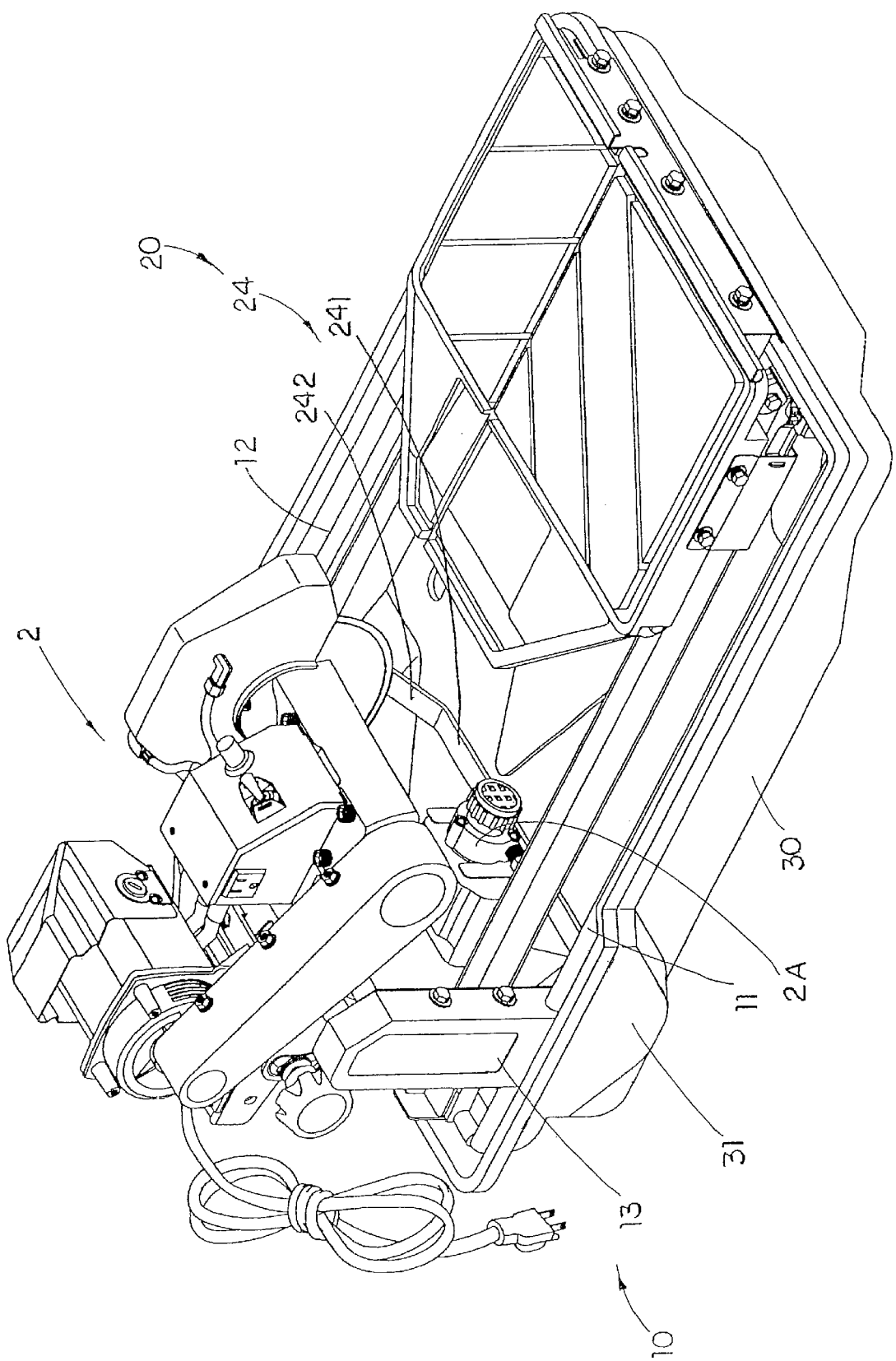
FIG. 1 is a perspective view of a power saw machine supported on a frame structure according to a first preferred embodiment of the present invention.

Referring to FIG. 1 of the drawings, a frame structure for power saw machine according to a first preferred embodiment of the present invention is illustrated, wherein the power saw machine is adapted for rigidly supporting on the frame structure.

Figure 2:
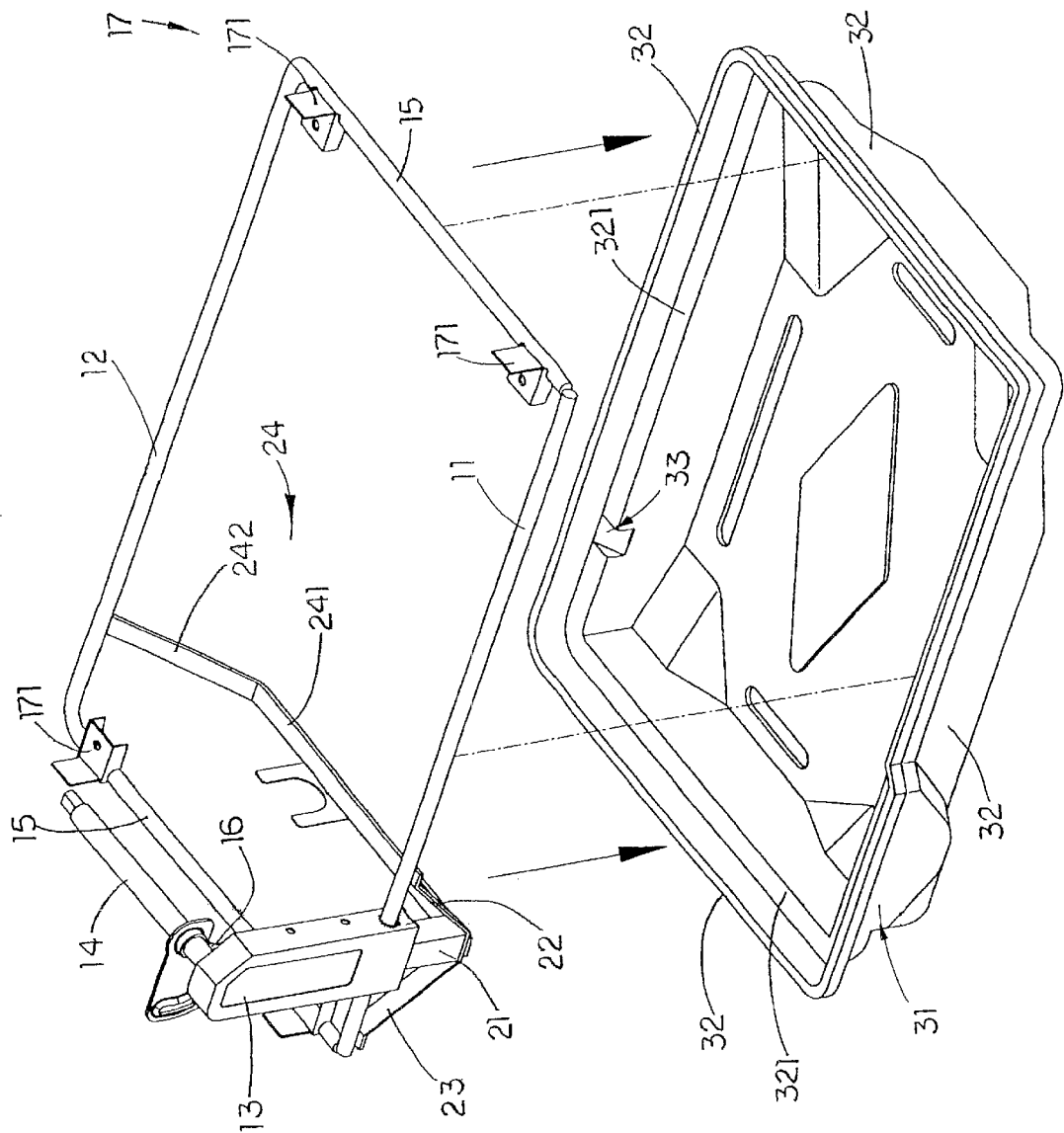
FIG. 2 is an exploded perspective view of the frame structure for power saw machine according to the first preferred embodiment of the present invention.
Figure 3:
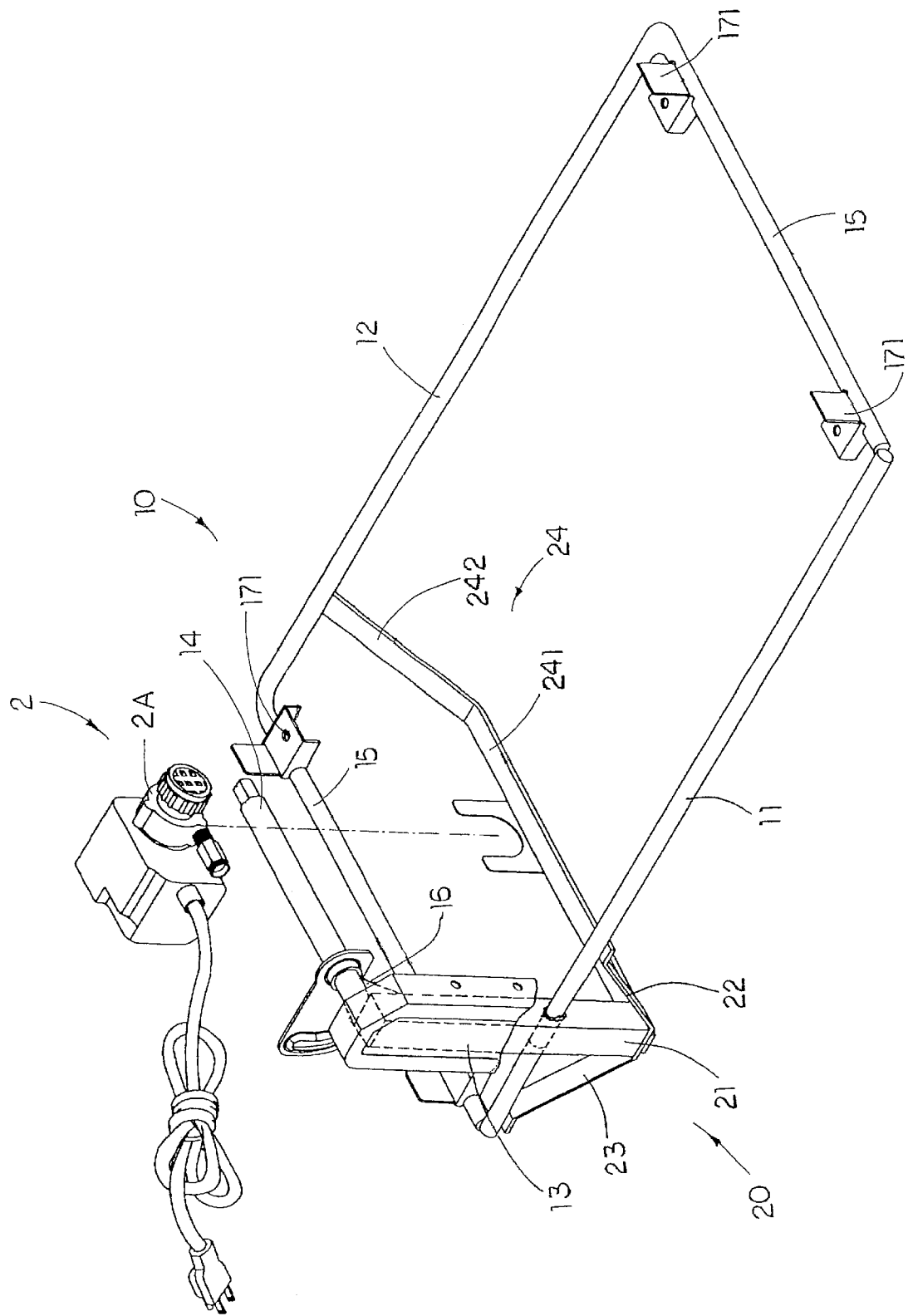
FIG. 3 is a perspective view of the frame structure for power saw machine according to the first preferred embodiment of the present invention.

As shown in FIGS. 2 and 3, the frame structure comprises a main frame 10, a supporting frame 20, and a collecting tray 30.

The main frame 10 comprises a first and second main arms 11, 12 in parallel manner, a main post 13 vertically supported by the first main arm 11, and a supporting shaft 14 horizontally extended from a top portion of the main post 13 for rigidly supporting a power saw assembly 2 thereon. The main frame 10 further comprises a pair of side arms 15 perpendicularly extended between the first and second main arms 11, 12 to form a rectangular shaped main frame 10.

For rigidly support the power saw assembly 2, the main post 13 is permanently connected to the first main arm 11 wherein the main post 13 has a through hole transversely formed thereon such that the first main arm 11 is fittedly penetrated through the through hole of the main post 13 and is welded at two ends of the through hole so as to avoid unwanted lateral movement between the main post 13 and the first main arm 11 while operating the power saw assembly 2. Thus, the strong connection between the main post 13 and the first main arm 11 will enhance a distribution of a vibration force from the power saw assembly 2 to the entire frame structure through the main post 13.

The supporting frame 20 comprises a supportive column 21 downwardly extended from the main post 13, a pair of support pillars 22, 23 each extended from a bottom end of the supportive column 21 to the first main arm 11 of the main frame 10 at a predetermined angle, and a support arm 24 extended from the bottom end of the supportive column 21 to the second main arm 12 of the main frame 10.

The collecting tray 30 has a receiving cavity 31 wherein the supporting frame 20 is fittedly disposed therein so as to substantially support the main frame 10 on the collecting tray 30.

According to the preferred embodiment, each of the support pillars 22, 23 has one end connected to the bottom end of the supportive column 21 and another end connected to the first main arm 11 of the main frame 10 in such a manner that the support pillar 22, 23 is inclinedly supported between the supportive column 21 and the main frame 10 at the predetermined angle of 45 degrees. So, a secure structure of triangular frame is constructed by the two support pillars 22, 23 for substantially supporting the main frame 10.

The support arm 24 has a horizontal arm portion 241 connected to the bottom end of the supportive column 21 and a slanted arm portion 242 connected to the second main arm 12 of the main frame 10 wherein the slanted arm portion 242 of the support arm 24 is integrally extended from the horizontal arm portion 241 thereof at an angle of 45 degrees.

Accordingly, since the horizontal arm portion 242 of the support arm 24 is transversely extended through a bottom portion of the collecting tray 30, a water pump 2A of the power saw assembly is adapted for mounting on the horizontal arm portion 241 of the support arm 24 so as to reduce the overall size of the power saw machine.

So, the two support pillars 22, 23 and the support arm 24 of the supporting frame 20 can rigidly support the main frame 10 and evenly distribute the vibration force generated from the power saw assembly 2 to the main frame 10 through the supporting frame 20 so as to enhance the operation of the power saw machine in a stable manner. As it is mention in the background, to maintain the stabilization of the power saw assembly 2 while operation is important because the lesser vibration force generated from the power saw assembly 2, the better cutting work can be obtained by the power saw assembly 2. So, when the vibration force is evenly distributed to the main frame 10 through the supporting frame 20, the power saw assembly 2 can be maintained in a stable manner while operation, so as to enhance the cutting quality of the power saw assembly 2.

As shown in FIG. 3, the two support pillars 22, 23 are formed in one piece member having a V-shaped structure, wherein the support arm 24 is securely mounted on a bottom end of the V-shaped support pillars so as to enhance the structure of the supporting frame 20 to distribute the vibration force through the entire frame structure. Thus, the integral feature of support pillars 22, 23 of the supporting frame 20 is simply and easy to manufacture so as to minimize the manufacturing cost and the assembly cost of the present invention.

Moreover, since the supporting shaft 14 is perpendicularly extended from the main post 13, the supporting shaft 14 may not rigid enough to support the heavy power saw assembly 2 thereon. For increasing the strength of the main frame 10, the main frame 10 further comprises an auxiliary supporting arm 16 mounted between the supporting shaft 14 and the main post 13 at a predetermined angle. The auxiliary supporting arm 16 has two ends biasing against the supporting shaft 14 and the main post 13 respectively, so as to form a secure triangular frame for the supporting shaft 14 for rigidly supporting the power saw assembly 2.

The collecting tray 30 is supported underneath the main frame 10 wherein the collecting tray 30 has a predetermined depth to fit the supporting frame 20 disposed therein. Moreover, the collecting tray 30 can be detached from the main frame 10 for cleaning or replacing the liquid coolant therein which is used to cool down the power saw assembly 2 and flush away saw dust.

One corresponding side of the collecting tray 30 defines the receiving cavity 31 which has a depth larger than a height of the supportive column 21 so as to fittedly dispose the supportive column 21 in the receiving chamber 31 of the collecting tray 30 when the supporting frame 20 is disposed in the collecting tray 30.

For fitting the main frame 10 on the collecting tray 30, the collecting tray 30 comprises four vertical walls 32 each having an inner supporting rim 321 adapted for substantially supporting the main frame 10 thereon. The main frame 10 further comprises a connecting means 17 for securely mounting the main frame 10 on the collecting tray 30 wherein the connecting means 17 comprises at least a mounting piece 171 connected on each side arm 15 to mount on the supporting rim 321 of the collecting tray 30 by means of a mounting screw.

Moreover, a guiding slot 33 is formed on one of the corresponding supporting rim 321 of the collecting tray 30 for aligning the slanted arm portion 242 of the support arm 24 of the supporting frame 20 with the supporting rim 321 of the collecting tray 30 when the supporting frame 20 is disposed in the collecting tray 30.

Figure 4:
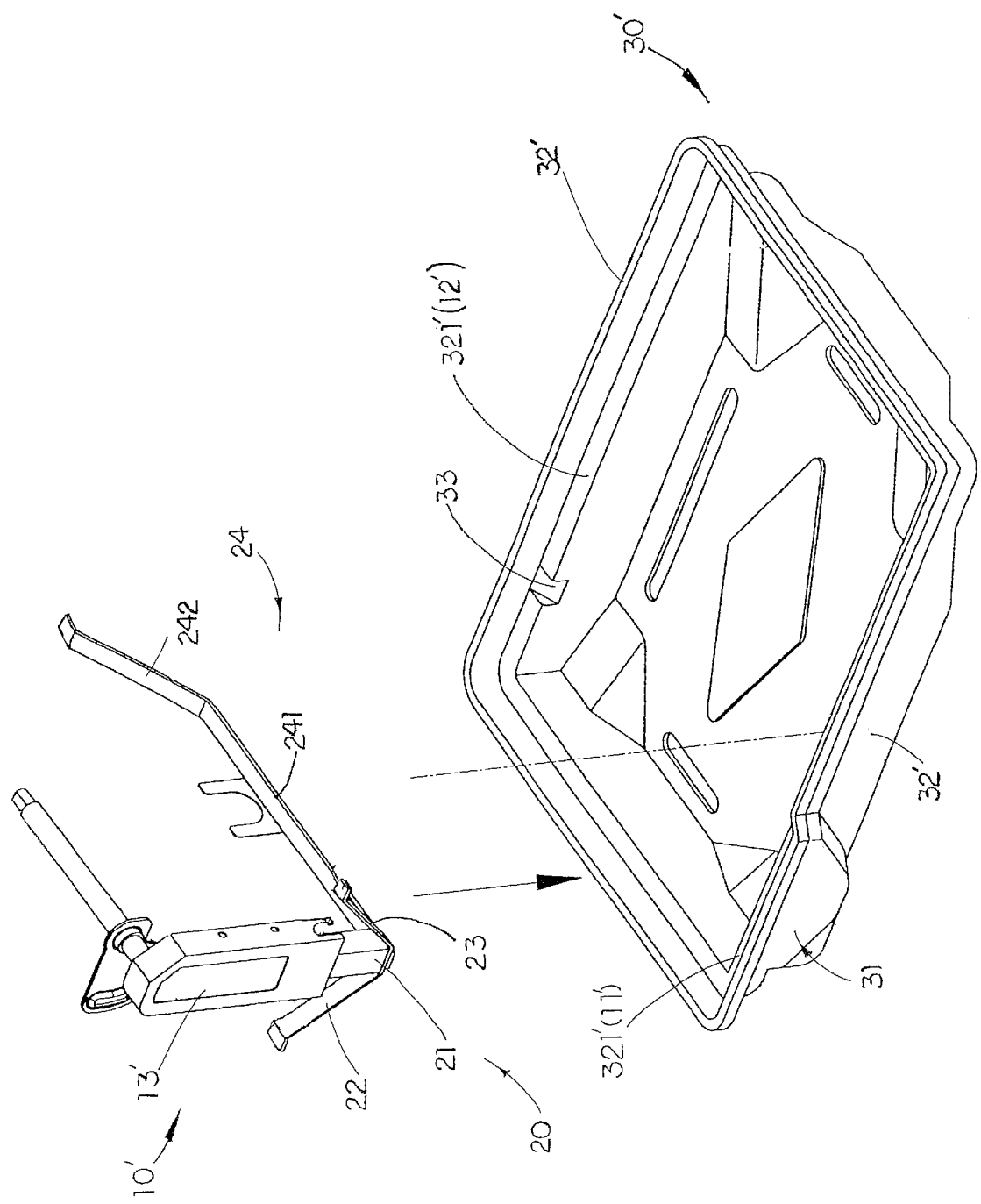
FIG. 4 is an exploded perspective view of a frame structure for power saw machine according to a second preferred embodiment of the present invention.

Referring to FIG. 4, a second embodiment of the present invention illustrates an alternative mode of the above first embodiment wherein the first and second main arms 11', 12' of the main frame 10' are integrally formed on the two supporting rims 321' of the parallel vertical walls 32' of the collecting tray 30'. In other words, the first and second main arms 11', 12' are built-in into the supporting rims 321' to support the main post 13'. It is worth to mention that in the second embodiment, the supporting rims 321' must be made of rigid material in order to substantially supporting the power saw assembly 2 thereon without distorting the shape of the collecting tray 30'.

In accordance with the preferred embodiments as disclosed above, the frame structure of the present invention can substantially support the power saw machine thereon. The supporting frame is connected to the main frame to form a secured triangular structure such that no complex structure of the main frame is required. Thus, the frame structure of the present invention is simple and in relative lightweight comparing with the conventional one so as to increase the portability of the power saw machine.

What is claimed is:

1. A frame structure for power saw machine, comprising:
    a main frame comprising first and second main arms in a parallel manner, a main post vertically supported by said first main arm, and a supporting shaft horizontally extended from an upper portion of said main post for rigidly supporting a power saw assembly thereon;

a supporting frame which comprises a supportive column downwardly extending from said main post and a support arm extended from a bottom end of said supportive column to said second main arm; and a collecting tray having a receiving cavity wherein said supporting frame is fittedly disposed therein so as to substantially support said main frame on said collecting tray.

2. A frame structure for power saw machine, as recited in claim 1, wherein said support arm has a horizontal arm portion connected to said bottom end of said supportive column and a slanted arm portion connected to said second main arm of said main frame wherein said slanted arm portion of said support arm is integrally extended from said horizontal arm portion thereof at an angle of 45 degrees.

3. A frame structure for power saw machine, as recited in claim 1, wherein said supporting frame further comprises a pair of support pillars each extended from said bottom end of said supportive column to said first main arm at a predetermined angle.

4. A frame structure for power saw machine, as recited in claim 3, wherein said two support pillars are formed in one piece member having a V-shaped structure and said support arm is securely mounted on a bottom end of said V-shaped support pillars.

5. A frame structure for power saw machine, as recited in claim 3, wherein each of said support pillars is inclinedly supported between said supportive column and said first main arm of said main frame at an angle of 45 degrees.

6. A frame structure for power saw machine, as recited in claim 5, wherein said support pillars are formed in one piece member having a V-shaped structure and said support arm is securely mounted on a bottom end of said V-shaped support pillars.

7. A frame structure for power saw machine, as recited in claim 3, wherein said support arm has a horizontal arm portion connected to said bottom end of said supportive column and a slanted arm portion connected to said second main arm of said main frame wherein said slanted arm portion of said support arm is integrally extended from said horizontal arm portion thereof at an angle of 45 degrees.

8. A frame structure for power saw machine, as recited in claim 7, wherein said two support pillars are formed in one piece member having a V-shaped structure and said support arm is securely mounted on a bottom end of said V-shaped support pillars.

9. A frame structure for power saw machine, as recited in claim 7, wherein said collecting tray comprises vertical walls each having an inner supporting rim adapted for substantially supporting said main frame thereon in such a manner that said first and second main arms are respectively supported on said supporting rims of said vertical walls so as to support said main frame in said collecting tray.

10. A frame structure for power saw machine, as recited in claim 9, wherein said collecting tray further has a guiding slot formed on one of said corresponding supporting rim of said vertical walls for aligning said slanted arm portion of said support arm with said supporting rim of said collecting tray when said supporting frame is disposed in said collecting tray.

11. A frame structure for power saw machine, as recited in claim 9, wherein said first and second main arm of said main frame are integrally formed on said supporting rims of said two vertical walls of said collecting tray, wherein said first and second main arms are built in said supporting rims to support said main post.

12. A frame structure for power saw machine, as recited in claim 7, wherein each of said support pillars is inclinedly supported between said supportive column and said first main arm of said main frame at an angle of 45 degrees.

13. A frame structure for power saw machine, as recited in claim 12, wherein said main frame further comprises an auxiliary supporting arm mounted between said supporting shaft and said main post at a predetermined angle, said auxiliary supporting arm having two ends biasing against said supporting shaft and said main post respectively, so as to form a secure triangular frame for said supporting shaft for rigidly supporting said power saw assembly.

14. A frame structure for power saw machine, as recited in claim 12, wherein said collecting tray comprises vertical walls each having an inner supporting rim adapted for substantially supporting said main frame thereon in such a manner that said first and second main arms are respectively supported on said supporting rims of said vertical walls so as to support said main frame in said collecting tray.

15. A frame structure for power saw machine, as recited in claim 14, wherein said collecting tray further has a guiding slot formed on one of said corresponding supporting rim of said vertical walls for aligning said slanted arm portion of said support arm with said supporting rim of said collecting tray when said supporting frame is disposed in said collecting tray.

16. A frame structure for power saw machine, as recited in claim 14, wherein said first and second main arm of said main frame are integrally formed on said supporting rims of said two vertical walls of said collecting tray, wherein said first and second main arms are built in said supporting rims to support said main post.

17. A frame structure for power saw machine, as recited in claim 12, wherein said two support pillars are formed in one piece member having a V-shaped structure and said support arm is securely mounted on a bottom end of said V-shaped support pillars.

18. A frame structure for power saw machine, as recited in claim 17, wherein said collecting tray comprises vertical walls each having an inner supporting rim adapted for substantially supporting said main frame thereon in such a manner that said first and second main arms are respectively supported on said supporting rims of said vertical walls so as to support said main frame in said collecting tray.

19. A frame structure for power saw machine, as recited in claim 18, wherein said tray further has a guiding slot formed on one of said corresponding supporting rim of said vertical walls for aligning said slanted arm portion of said support arm with said supporting rim of said collecting tray when said supporting frame is disposed in said collecting tray.

20. A frame structure for power saw machine, as recited in claim 19, wherein said main frame further comprises an auxiliary supporting arm mounted between said supporting shaft and said main post at a predetermined angle, said auxiliary supporting arm having two ends biasing against said supporting shaft and said main post respectively, so as to form a secure triangular frame for said supporting shaft for rigidly supporting said power saw assembly.

21. A frame structure for power saw machine, as recited in claim 19, wherein said first and second main arm of said main frame are integrally formed on said supporting rims of said two vertical walls of said collecting tray, wherein said first and second main arms are built in said supporting rims to support said main post.

22. A frame structure for power saw machine, as recited in claim 21, wherein said main frame further comprises an auxiliary supporting arm mounted between said supporting shaft and said main post at a predetermined angle, said auxiliary supporting arm having two ends biasing against said supporting shaft and said main post respectively, so as to form a secure triangular frame for said supporting shaft for rigidly supporting said power saw assembly.

23. A frame structure for power saw machine, comprising:

a main frame comprising first and second main arms in a parallel manner, a main post vertically supported by said first main arm, and a supporting shaft horizontally extended from an upper portion of said main post for rigidly supporting a power saw assembly thereon;

a supporting frame which comprises a supportive column downwardly extending from said main post and a pair of support pillars each extended from a bottom end of said supportive column to said first main arm at a predetermined angle; and a collecting tray having a receiving cavity wherein said supporting frame is fittedly disposed therein so as to substantially support said main frame on said collecting tray.

24. A frame structure for power saw machine, as recited in claim 23, wherein each of said support pillars is inclinedly supported between said supportive column and said first main arm of said main frame.

25. A frame structure for power saw machine, as recited in claim 23, wherein said two support pillars are formed in one piece member having a V-shaped structure and said support arm is securely mounted on a bottom end of said V-shaped support pillars.

* * * * *